United States Patent [19]
Smale et al.

[11] 3,970,252
[45] July 20, 1976

[54] COOLED EXHAUST DUCT
[75] Inventors: Charles H. Smale, Indianapolis, Ind.; James A. Pyne, Jr., Phoenix, Ariz.
[73] Assignee: General Motors Corporation, Detroit, Mich.
[22] Filed: Sept. 28, 1967
[21] Appl. No.: 672,678

[52] U.S. Cl. .............................. 239/127.3; 60/265; 60/271
[51] Int. Cl.² ....................................... B64D 33/04
[58] Field of Search ................... 60/265, 266, 271; 239/127.1, 127.3

[56] References Cited
UNITED STATES PATENTS

| | | | |
|---|---|---|---|
| 2,974,486 | 3/1961 | Edwards | 60/266 |
| 3,210,934 | 12/1965 | Smale | 60/265 |
| 3,262,264 | 7/1966 | Gardiner et al. | 239/127.3 |
| 3,372,874 | 3/1968 | Colville et al. | 239/127.3 |
| 3,374,624 | 3/1968 | Coplin | 60/39.66 |

Primary Examiner—Samuel Feinberg
Attorney, Agent, or Firm—Paul Fitzpatrick

[57] ABSTRACT

An exhaust duct for a turbofan aircraft engine includes a bulbous inner cone which blocks direct sight of the turbine through the duct. Ram air from the fan is caught by scoops and conveyed from a plenum into the double outer wall of the exhaust duct and through hollow struts to the inner cone. Circumferential outlets for film cooling air are distributed axially of the surface of the outer and inner walls. Also, film cooling air is discharged from the struts to cool the rear part of the struts which are visible from without the engine. Direct radiation from within the cone to the outside is blocked by ribs extending into the inside of the inner cone immediately upstream of the cooling air outlets.

6 Claims, 3 Drawing Figures

INVENTORS
James A. Pyne, Jr. &
BY  Charles H. Smale

Paul Fitzpatrick
ATTORNEY

COOLED EXHAUST DUCT

Our invention relates to improved exhaust duct or exhaust cone structures adpated for cooling to minimize the radiation from the exhaust of a gas turbine engine, particularly an aircraft ducted fan engine.

As explained in U.S. Pat. No. 3,210,934 of C. H. Smale, Oct. 12, 1965, it may be desirable in some cases to minimize light or infrared radiation from the exhaust pipe of an aircraft gas turbine. Means to minimize such radiation include configuring the exhaust duct so as to block direct sight of the turbine, cooling parts of the exhaust duct, and treating the surfaces so as to minimize reflection in the upstream part of the duct and minimize radiation in the downstream part of the duct. The principles involved are described in the Smale patent, and also are embodied to a considerable extent in the radiation suppressing structure disclosed in U.S. Pat. application Ser. No. 529,406 of Pyne, Smale, and others for Radiation Suppressor for a Turbine Engine Exhaust, filed Feb. 23, 1966, of common ownership with this application (abandoned: see Canadian Pat. No. 786,034, issued May 28, 1968).

The present invention is directed primarily to improved means for cooling the visible parts of the exhaust duct or exhaust cone and also to improved means for supplying cooling air, involving using air rammed by the fan or a ducted fan engine, collected by scoops, and directed into a plenum from which it is distributed to the parts to be cooled. The cooling involves the emission of the air as a film over the surface of these parts so as to cool them and particularly to insulate or isolate them from the hot exhaust gas so as to reduce the transmission of heat from the exhaust gas to the metal parts.

The nature of our invention and its advantages will be clear to those skilled in the art from the succeeding detailed description of the preferred embodiment of the invention and the accompanying drawings thereof.

Figure 1:
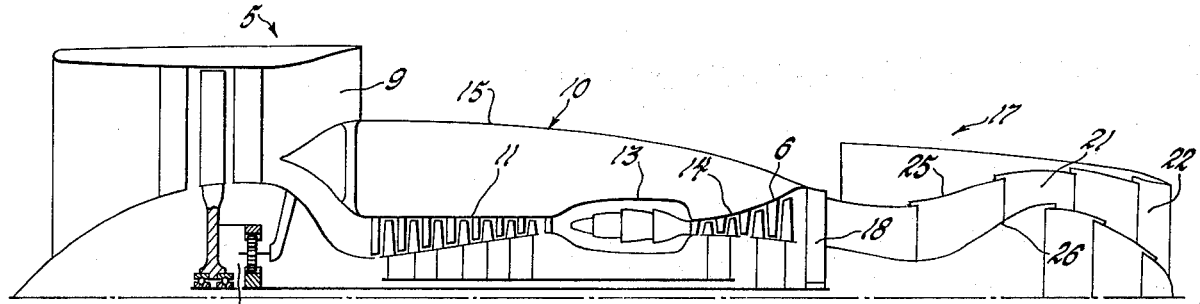
FIG. 1 is a schematic diagram of a turbofan engine of known type with our improved exhaust structure.

Referring first to FIG. 1, in which a turbofan engine of known type is presented somewhat schematically in axial section as background to the explanation of our invention, the engine comprises a ducted fan 5 which is driven by a turbine 6 through shafting and gearing 7. The fan discharges air at high velocity through a fan outlet 9. The turbine 6 is energized by a gas generator 10 which is made up of a compressor 11 supplied by part of the discharge from the ducted fan, a combustion apparatus 13 supplied by the compressor, and a turbine 14 which drives the compressor 11. The exhaust from turbine 14 drives turbine 6. The engine may be enclosed in an outer wall structure 15.

Figure 2:
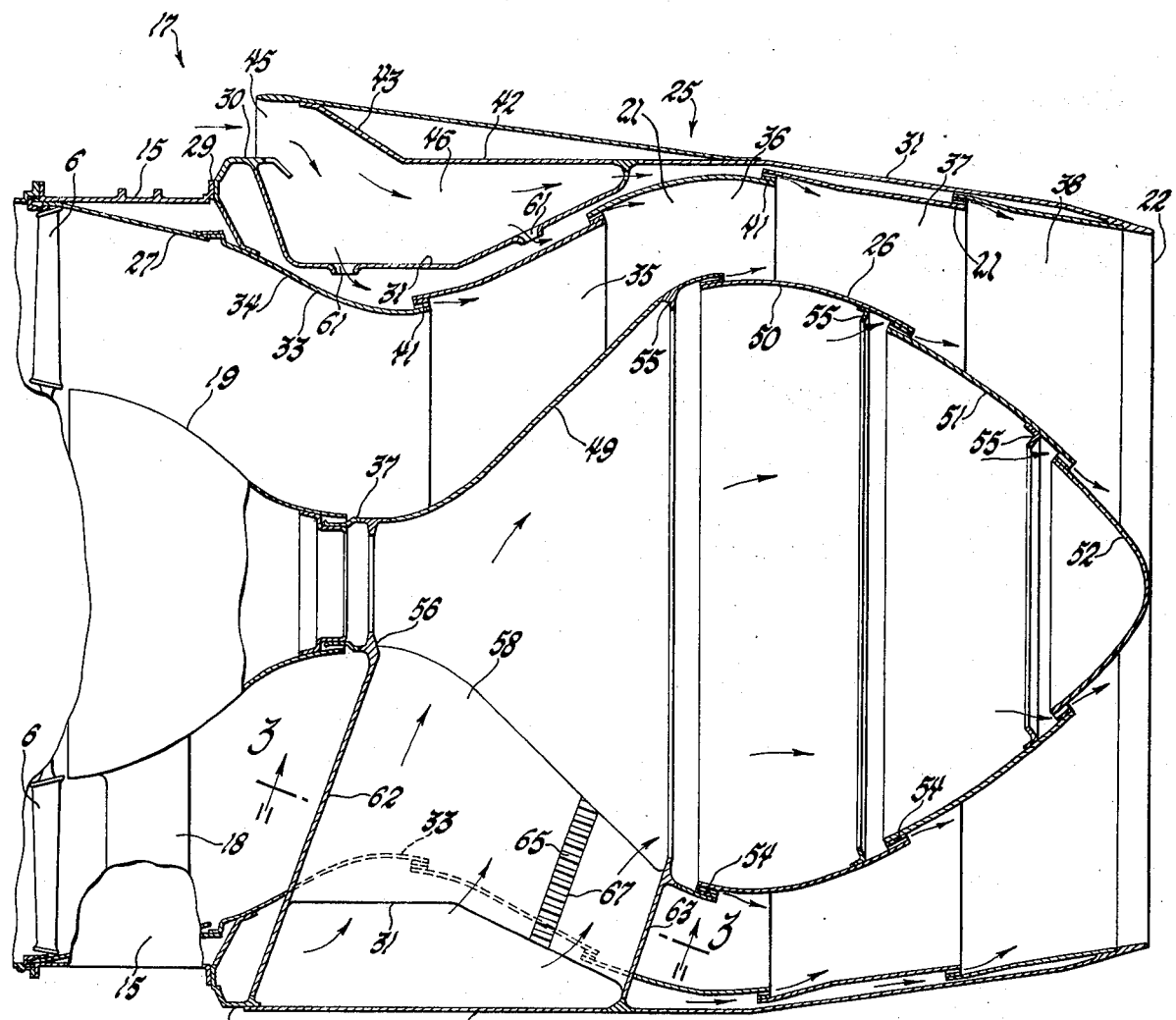
FIG. 2 is a longitudinal sectional view of an exhaust cone structure according to the invention.

The exhaust from the turbine 6 is carried through an exhaust section, exhaust duct, or exhaust cone indicated generally by 17 in FIG. 1, and shown more particularly in the remaining figures. Referring now to FIG. 2, there is illustrated the last wheel of turbine 6, the terminal portion of the outer wall 15 of the engine, and a strut 18 which is one of a set of struts supporting the rotor of turbine 6. The rotor bearing (not illustrated) at the outlet of turbine 6 is disposed in a generally conical bearing housing 19. An exhaust passage 21 extending from the turbine 6 to the engine outlet 22 is defined between inner and outer walls indicated generally as 25 and 26, the inner wall 26 being also referred to as an inner body or inner cone.

The outer wall of the exhaust duct is of a double-walled construction, the initial portion being defined by the case 15 and a fairing or shroud 27. The structure of the exhaust nozzle as such begins with a bolting flange at 29 at which the exhaust structure is fixed to the rest of the engine. A stiffener ring 30 bolts to the engine at the bolting flange. An outer sheet 31 continues downstream to the engine outlet 22. An inner sheet 33 is made up of a number of overlapped or telescoping sections, the first being section 34 which lies in overlapping relation to the shroud 27, succeeding sections being identified as 35, 36, 37, and 38. These sheets are bodies of revolution and are connected to each other by corrugated strips 41 which space the adjacent sections slightly from each other to provide a gap for entrance of film cooling air. Structure of this sort is well known in application to combustion liners and other bodies requiring cooling. See, for example, U.S. Pat. No. 3,064,424 to Tomlinson.

The exhaust structure also includes a structural external wall 42 which extends from sheet 31 to the stiffener ring 30. The external wall is flared outwardly locally as indicated at 43 so that it defines between its leading edge and the ring 30 a number of ram air scoop inlets 45 which receive air propelled by the ducted fan 5. The air is received in a plenum chamber 46 between the external wall 42 and the outer sheet 31.

The inner wall or inner body 26, as shown, is of generally bulbous configuration, enlarging downstream from a front end ring 37 roughly to the middle of its length and then converging to a termination approximately in the plane of the outlet 22. The exhaust passage 21 is blocked from direct sight through it into the turbine, and any radiation must be reflected from the walls to escape from the turbine to the exterior of the engine. This is as taught in the Smale patent referred to.

The inner wall comprises a forward section 49 diverging rearwardly and, as shown, three converging overlapping or telescoped sections 50, 51, and 52 extending to the tip of the inner body. The sections 50, 51, and 52 are connected by corrugated strips 54 in the same manner as the sections of the inner sheet of the outer wall. Sections 49, 50, and 51 include stiffener rings or flanges 55 which provide ribs extending into the inner body immediately upstream of the film air outlets between the sections so that direct radiation from the inner surface of the inner body through the film air outlets is prevented. This is particularly desirable since the forward section 49 is a very hot part of the exhaust duct. A further stiffening ring 56 is provided at the forward end of section 49 of the inner body.

The inner body is supported by six radial struts 58 which extend from the outer structural wall 42 through the sheets 31 and 33 of the outer wall to the section 49 of the inner wall. The struts open at their inner ends into the body 26 and open at their outer ends into the annular plenum 46. The plenum is thus connected directly to the interior of the inner body to supply cooling air for discharge through the gaps provided by the corrugated strips 54.

The ram air inlets 45 are disposed circumferentially between the struts and may be of any desired number, such as three inlets. The cooling air is also supplied from plenum chamber 46 to the space between the inner and outer sheets of the outer wall through a number of metering openings 61 in the wall 31 where it divides chamber 46 from the space between sheets 31 and 33. The size and number of openings 61 is such as to provide the desired division of the air and rate of flow as between the outer and inner walls of the exhaust passage.

Figure 3:
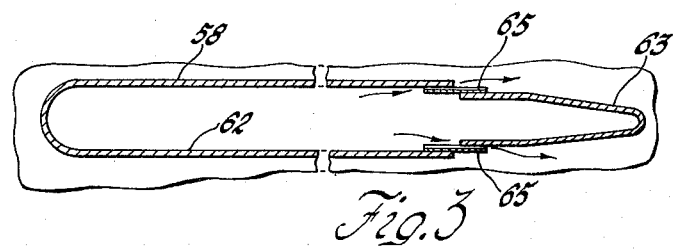
FIG. 3 is a detail sectional view taken in the plane indicated by the line 3—3 in FIG. 2.

As seen in FIG. 3, the struts 58 are of elongated thin cross section defined by a U-shaped section 62 at the forward edge and a tapering or V-shaped section 63 at the trailing edge, these being connected by two corrugated strips 65, one on each face of the strut. The struts thus define outlets 67 for cooling air extending the length of the strut across the exhaust passage. The trailing portion of the strut, which is partially visible from exterior of the engine, is thus bathed in film cooling air.

As will be apparent, the structure according to the invention may be assembled by well-known welding or brazing techniques and presents no new problems in fabrication. The cooling air may be distributed so as to avoid waste of cooling air and any unnecessary impairment of the thrust of the aircraft engine, but to provide sufficient well-distributed film cooling air to reduce the temperatures of the visible surfaces to a level at which radiation is very slight. Transmission of heat from the exhaust gases to the metal parts is largely eliminated by the thin film of cool air isolating the metal parts from the exhaust gas.

The structure could be used with various sources of compressed air — for example, it could be conducted from a suitable stage of the engine compressor. However, the preferred structure is one as shown in which the cooling air is picked up from the slipstream of the ducted fan. This may be done whether or not the air propelled by the ducted fan is open to the atmosphere as illustrated in FIG. 1, or is confined within an engine nacelle which provides an outer wall for the fan discharge extending past the ram air inlets 45.

It will be seen that the structure described provides a simple and effective arrangement for minimizing radiation from the exhaust portions of the engine. It has been calculated that the exhaust duct may be kept below 500° F. by the use of approximately two percent of the discharge of the fan.

The detailed description of the preferred embodiment of our invention for the purpose of explaining the principles thereof is not to be considered as limiting or restricting the invention, since many modifications may be made by the exercise of skill in the art.

We claim:

1. A film cooled gas turbine exhaust duct comprising, in combination,
    an outer body,
    a bulbous hollow inner inner body,
    the bodies defining between them an exhaust duct for hot gas,
    the inner body comprising a plural number of radially spaced telescoped sections defining gaps spaced axially of the exhaust duct for flow of cooling gas between the sections,
    the gaps extending circumferentially of the exhaust duct and opening in the direction of flow through the exhaust duct so as to provide a film of cooling gas over the surface of the inner body,
    ribs disposed circumferentially of the inside of the inner body adjacent the gaps so as to block direct transmission of radiation from within the inner body through the gaps,
    and means for supplying a cooling gas into the inner body.

2. An exhaust duct as recited in claim 1 including also means providing film cooling for the outer body.

3. An exhaust duct as recited in claim 1 including also struts extending radially between the said bodies, and means defining gaps for cooling gas extending radially on the sides of the struts.

4. An exhaust duct as recited in claim 3 includng also means providing film cooling for the outer body.

5. An exhaust duct as recited in claim 1 in which the last-recited means includes at least one air scoop projecting from the outer body in position to intercept slipstream air.

6. A cooled exhaust cone for a propulsion engine comprising, in combination,
    a hollow outer wall defined by mutually spaced outer and inner sheets,
    an inner wall defining a substantially closed chamber within the inner wall,
    the outer and inner walls defining between them an engine exhaust duct, means defining a cooling air plenum chamber disposed around the outer wall,
    hollow struts extending across the exhaust duct connecting the plenum chamber to the said closed chamber,
    means connecting the plenum chamber to the space between the outer and inner sheets,
    means defining annular axially-spaced film cooling outlets for the cooling air from the inner sheet and the inner wall extending circumferentially of the exhaust duct so as to provide a film of cooling air over the outer and inner walls of the exhaust duct, with circumferential ribs extending from the inner wall into the chamber therein in position to block direct radiation through the film cooling outlets of the inner wall,
    and air scoops projecting from the plenum chamber adapted to pressurize the chamber with air diverted from a slipstream passing the exhaust cone.

* * * * *